July 8, 1952           D. S. HENRY           2,602,695
SPRAYING APPARATUS
Filed March 25, 1949                             2 SHEETS—SHEET 1
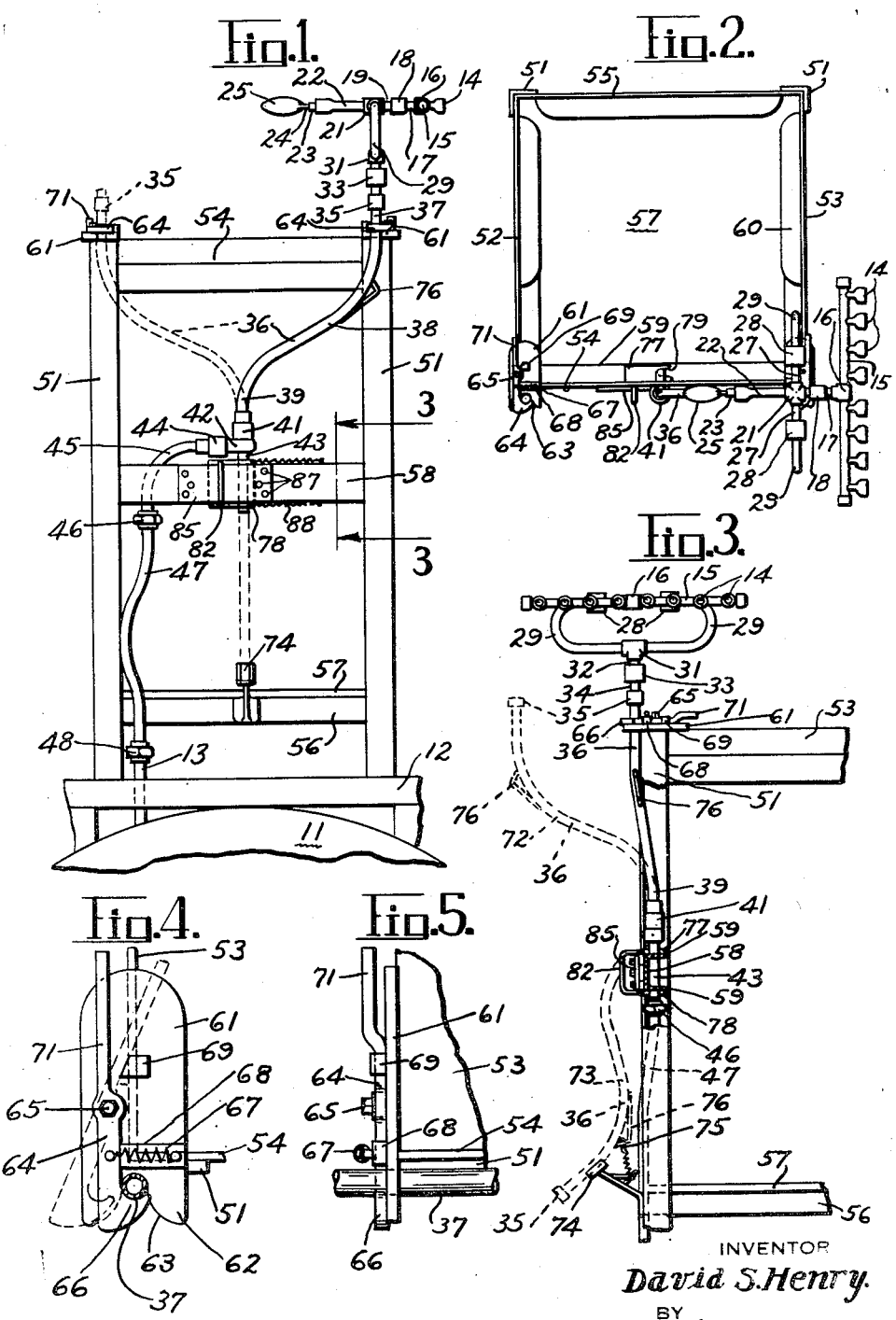
INVENTOR
David S. Henry
BY
Walter S. Edwards
ATTORNEY July 8, 1952
D. S. HENRY
2,602,695
SPRAYING APPARATUS
Filed March 25, 1949
2 SHEETS—SHEET 2
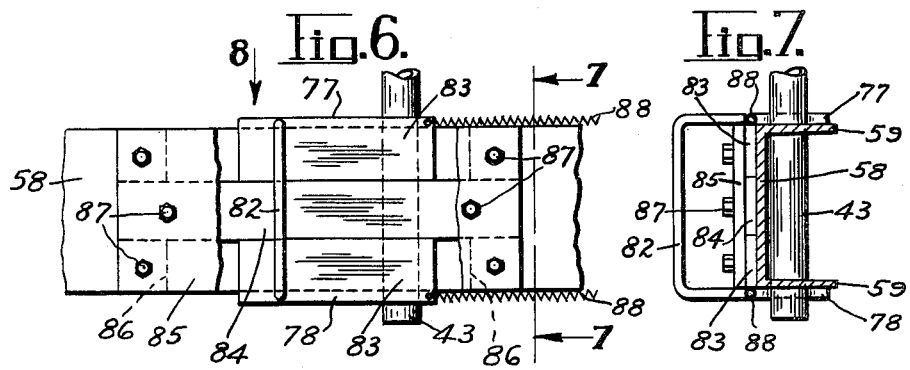
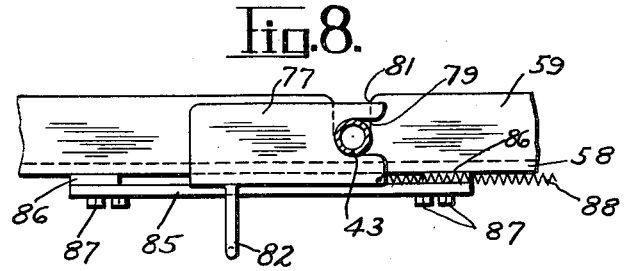
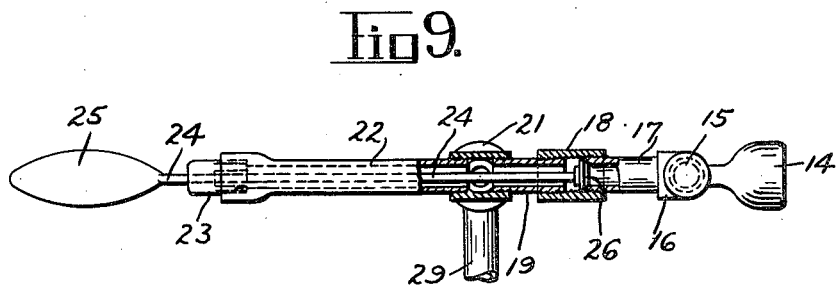
INVENTOR
*David S. Henry.*
BY
*Walter S. Edwards.*
ATTORNEY Patented July 8, 1952

2,602,695

UNITED STATES PATENT OFFICE 2,602,695

SPRAYING APPARATUS

David S. Henry, Wallingford, Conn.

Application March 25, 1949, Serial No. 83,380

4 Claims. (Cl. 299—39)

This invention relates to spraying apparatus and more particularly to such apparatus especially adapted for spraying trees, such as fruit trees set out in rows in an orchard.

Due to the use of high pressure spraying equipment the manual holding of spray nozzles is particularly laborsome requiring occasional stoppage for recuperation of the operator thus causing loss in time. When spraying trees set out in rows, as in an orchard, it is necessary to move the spray nozzle, or nozzles up and down, as well as sidewise, and to direct the spray with the direction of the wind, to insure an even spread of the sprayed material upon each tree. In large orchards the spraying equipment is usually mounted on a truck and has a plurality of nozzles arranged in alignment to obtain the desired volume of spray material directed toward and upon the trees as the truck is driven along side the row of trees. The back pressure upon the nozzle holding frame, due to the high pressure used, makes it difficult for the operator to properly direct the spray material upon and about each tree.

To obviate the above disadvantages it is proposed as an object of this invention to provide spray apparatus embodying the features and principles of this invention whereby the tiring effect of the manipulation of the spray nozzle, in directing the spray, will be reduced to a minimum.

Another object is to provide in spray apparatus means to properly dispose the spray nozzles in a desired direction and in such a manner that the back pressure on the nozzles will be absorbed by parts of the spray apparatus rather than by the operator.

Still another object is to provide a spray apparatus of the above nature wherein means is provided to releasably lock the spray nozzles in the desired position.

A further object is to provide an improved spray apparatus which will be relatively inexpensive to manufacture, simple in construction, compact, and very efficient and durable in use.

With these and other objects in view, which will appear as the description proceeds there has been illustrated, in the accompanying drawings, one form of spray apparatus in which the features and principles of this invention may be conveniently and practically embodied.

In the drawings:

Figure 1 is a front elevational view of the spray apparatus embodying the features and principles of this invention;

Figure 2 is a top plan view of the same;

Figure 3 is a side elevational view partly in section on line 3—3 of Figure 1;

Figures 4 and 5 are enlarged top plan and side views, respectively, of a releasable catch, or locking means, used with the apparatus of this invention, and forming a part thereof;

Figure 6 is an enlarged front face view of releasable catch, or locking mechanism used with the spray apparatus of this invention and forming a part thereof;

Figure 7 is a cross-sectional view of the mechanism shown in Figure 6 taken on the line 7—7 of Figure 6;

Figure 8 is a top plan view of the mechanism shown in Figure 6 looking in the direction of arrow 8 in Figure 6; and Figure 9 is an enlarged side view, partly in section, of the spray nozzle holding frame and control valve for the nozzles.

Referring now to the drawings wherein like reference numerals designate like parts throughout the several views, the numeral 11 denotes a tank containing a supply of spray material, such as a fluid insecticide, and which is preferably mounted upon a truck (not shown) which may be driven, or drawn between rows of trees. A platform 12 is preferably provided upon the tank 11 to support the spray apparatus of this invention and a pipe 13 may lead upwardly from the tank 11, or from a pump mechanism (not shown) to provide a passage for spray material under pressure from the source of supply in the tank 11 to the spray apparatus of this invention.

The spray apparatus of this invention includes a plurality of spray nozzles 14, although only one nozzle may be used if desired, extending outwardly from a pipe 15 which is connected by a pipe T 16 and a close nipple 17 to a valve casing 18, the valve casing in this instance being a standard pipe coupling. The valve casing 18 is connected by a close nipple 19 to a pipe cross 21, which cross is in turn connected to a length of pipe 22. The length of pipe 22 is disposed in alignment with the valve casing 18 each extending from opposite sides of the pipe cross 21. The outer end of the length of pipe 22 is adapted to serve as a support for an internally threaded sleeve 23 which is screwed thereinto. A valve control rod 24 extends from a handle 25 and is screwed into and through the sleeve 23, and extends through the length of pipe 22, the pipe cross 21 and has a valve head 26, see Figure 9, upon its inner end. The valve head 26 is adapted to seat upon the inner end of the close nipple to close the entrance to the pipe 15 and nozzles 14 from the pipe cross 21, and thus to control the amount of fluid passing through the cross 21 into and out of, said nozzles 14, by proper rotative manipulation of the handle 25.

The pipe cross 21 has a short nipple 27 extending from each side thereof, each of which is connected to a standard pipe swivel 28. The swivels 28 allow the nozzles 14 to be swung by the handle 25, in a vertical plane, on a horizontal axis of the cross 21 whereby spray therefrom may be directed from the bottom to the top of a tree. A curved pipe portion 29 extends from each swivel 28 to a pipe T 31. The pipe T 31 is connected by a short nipple 32 to a standard pipe swivel 33. The swivel 33 allows the looped pipe frame, constituted by the curved pipe portions 29, to be swung with the nozzles 14 by the handle 25, in a horizontal plane, on a vertical axis at the swivel 33. A short pipe nipple 34 connects the swivel 33 to a pipe connector 35, which, in turn is connected to a pipe 36.

The pipe 36 has an upper portion 37 which is substantially vertical, an intermediate portion 38 which has reverse bends therein to dispose a lower substantially vertical portion 39 spaced inwardly from the upper portion 37. The lower pipe portion 39 is connected to a standard pipe swivel 41 so as to swing sidewise on a vertical axis. The swivel 41 is connected to a connector 42 which has a short length of pipe, or bar, 43 extending downwardly therefrom and in alignment therewith. A standard pipe swivel 44 is connected to and extends outwardly from the connector 42, and is disposed on a horizontal axis whereby the pipe 36 with the nozzles 14 may be swung in a vertical plane on the axis of the swivel 44. The pipe 13 from the tank 11 may be connected to the swivel 44 in any desired manner, a bent pipe 45, a pipe union 46, a pipe section 47, and a pipe union 48 being shown in the drawings, for this purpose.

The spray apparatus of this invention also includes means to support the spray nozzles 14, and the various parts above referred to whereby these nozzles may be swung to various directions while being connected to the supply of spray material in the tank 11. The support for the nozzles and the parts associated therewith comprises a vertically disposed framework composed of vertical corner angle bars, or uprights, 51 connected at their lower ends to the platform 12 and connected together at their upper ends by side cross bars 52 and 53 and front and rear cross bars 54 and 55 respectively. The pipe section 47 is secured to one of the uprights 51 by welding. Adjacent the lower end of the framework, angle, or like bars 56, extending between each pair of the upright bars 51, support a floor 57. A horizontally disposed channel bar 58 extends between the front upright bars 51 intermediate the front cross bar 54 and the floor 57, the flanges 59 of the channel bar 58 being directed rearwardly, or inwardly in respect to the framework. Back resting pads 60 may be provided on the cross bars 52, 53 and 55 if desired.

The spacing between the upper pipe portion 37 and the lower pipe portion 39 is of such amount that the lower pipe portion 39 with the aligned and depending short length of pipe 43, will be disposed substantially centrally between the front pair of uprights 51, and the upper pipe portions 37 will be in alignment with the front upright 51 toward which it may be swung (see Figure 1). Catches, or like locking means, are provided to releasably retain the upper pipe portion in swung position with the nozzles 14, there being one catch provided at each front upright 51. Each of the catches, or locking means, comprises a base plate 61 which is seated on, and preferably welded to, the front upright 51 and extends rearwardly on top of the adjacent side cross bar 52 or 53. The front end 62 of each plate 61 is provided with a flared mouth opening 63 in which the pipe portion 37 is received.

A latch member 64 is pivoted at 65 to the plate 61 and has a hook 66 on its front end to swing in front of the pipe portion 37 and lock it in the plate opening 63. A spring 67 secured to the latch 64 and to the plate 61 acts on the latch to constantly urge it into pipe locking position. A stop lug 68 is provided on the plate 61 to limit the movement of the latch 64 in pipe locking direction, full lines in Figure 4, and another stop lug 69 is provided on the plate 61 to limit the swinging movement of the latch 64 into pipe releasing direction, dotted lines in Figure 4, by being in the path of a latch handle 71. By the use of the above described catches the pipe 36, with the nozzles 14, may be swung from the full line position to the dotted position, Figure 1, being pivoted at the swivel 41, and securely locked in position.

The pipe 36 with the nozzles 14 may be swung outwardly to the dotted position 72 shown in Figure 3 using the swivel 41 as a pivot, and then swung downwardly into the dotted position 73 using the swivel 44 as a pivot. When in the position 73 the pipe 36 rests against a pad 74 extending upwardly and outwardly from the front face of one of angle bars 56. A spring activated hook 75 is adapted to be engaged in a loop 76 secured to the pipe 36 whereby the pipe 36 and the nozzles are releasably and firmly retained in the lowered position 73 when not in use.

Catch means is provided to releasably secure the pipe 36 and nozzles in upwardly extending position for operation thereof. This catch means comprises (see Figures 6, 7 and 8) a pair of latch members 77 and 78 disposed one above and upon the upper flange 59 of the channel 58 and one below and upon the lower flange 59 of said channel, for sliding movement therealong. Each latch member 77 and 78 is provided with a longitudinally directed slat 79 open at the same end of each and positioned to receive and embrace the bar 43 extending from the connector 42 when the latches are moved in unison in one direction, in this instance, to the right. The channel flanges 59 are slotted as at 81 to receive and embrace the bar 43 when the pipe 36 is swung upwardly from position 73 into operable position. The latch members 77 and 78 are secured together for simultaneous movement by a handle 82 which is welded, or otherwise secured to each latch member.

Each latch member 77 and 78 has a flange 83 extending at right angles thereto and toward each other over the outer front surface of the channel member 58. The inner and opposing edges of the flanges 83 ride on a guide bar 84 secured to the front face of the channel member 58. A plate 85, spaced away from the front face of the channel member 58 by corner blocks 86, and overlying the flanges 83 and guide bar 84, is secured to the front face of the channel member 58 by screws 87. Springs 88 each having an end attached to the slotted end of one latch member and the other end attached to the channel member 58 act to constantly urge the latch members 77 and 78 into bar 43 receiving and embracing position when the bar 43 is disposed in the slots 81 in the channel member 58. The latch members 77 and 78 may be retracted to release the bar 43 by the use of the handle 82.

The spraying apparatus of this invention when mounted, for instance, on a truck and in connection with a source of spray material under pressure is particularly efficient for spraying trees, or the like, set in rows, such as in an orchard. All back pressure from the spray nozzles will be imposed upon the framework rather than on the operator, who thus may devote his energy in desirably directing the nozzles toward the trees to be sprayed in the row nearest the side of the framework to which the pipe 36 is locked, by proper manipulation of the handle 25 to swing the nozzles on the swivels 28 and 31. After traveling the length of a row of trees and having sprayed the trees on one side, of the row, the truck may be turned to travel back along the same row and the pipe 36 and nozzles 14 turned on the swivel 41 to be locked to the other side of the framework. Due to the provision of the swivels 28 and 31, the spray nozzles 14 have, in effect a universal movement on the pipe 36, and due to the swivels 41 and 44 the pipe 36 with the nozzles 14 has a universal movement on the framework.

While there has been shown and described herein a spraying apparatus in which the features and principles of this invention may be embodied in practice, it will be understood that the same may be embodied in other specific forms without departing from the spirit and essential attributes thereof, and it is therefore desired that the present embodiment be considered in all respects as illustrative and not restrictive, reference being had to the claims rather than to the foregoing disclosure to indicate the scope of the invention.

Having thus fully disclosed the invention, what is claimed as new and for which it is desired to secure Letters Patent, is:

1. In spraying apparatus, a platform to support an operator, a frame extending upwardly from said platform and providing laterally spaced stations at the upper portion thereof for positioning a spray nozzle, a spray nozzle, an elongated generally upwardly directed rigid conduit having its upper end connected to said nozzle and its lower end laterally spaced with respect to its upper end and connected to a source of spray material, a swivel connection for the lower end of said conduit in fixed relationship to the frame providing for swinging movement of said conduit on a vertical axis to move said spray nozzle selectively to said nozzle-positioning stations, and releasable catch means at each station engageable with the upper portion of said conduit to hold the latter from displacement.

2. In spraying apparatus, a platform to support an operator, a frame extending upwardly from said platform and providing laterally spaced stations at the upper portion thereof for positioning a spray nozzle, a spray nozzle, an elongated generally upwardly directed rigid conduit having its lower end laterally spaced from its upper end and connected to a source of spray material, swivel means of connection between said spray nozzle and said conduit providing for swinging movement of said spray nozzle in vertical and horizontal directions, a swivel connection for the lower end of said conduit in fixed relationship to the frame providing for swinging movement of said conduit on a vertical axis to move said spray nozzle selectively to said nozzle-positioning stations, and releasable catch means at each station engageable with the upper portion of said conduit to hold the latter from displacement.

3. In spraying apparatus, a platform to support an operator, a frame extending upwardly from said platform and providing laterally spaced stations at the upper portion thereof for positioning a spray nozzle, a spray nozzle, an elongated generally upwardly directed rigid conduit having its upper end connected to said nozzle and its lower end laterally spaced with respect to its upper end and connected to a source of spray material, swivel means of connection for the lower end of said conduit in fixed relationship to the frame providing for swinging movement of said conduit on a vertical axis to move said spray nozzle selectively to said nozzle-positioning stations and providing for swinging movement of said conduit on a horizontal axis to move said nozzle to a lower and inoperative position, and releasable catch means at each of said stations engageable with the upper portion of said conduit to hold the latter from displacement.

4. In spraying apparatus, a platform to support an operator, a frame extending upwardly from said platform and generally rectangular in cross section providing two stations at adjacent corners of the frame for positioning a spray nozzle, a spray nozzle, an elongated generally upwardly directed rigid conduit having its upper end connected to said nozzle and its lower end laterally spaced from its upper end and connected to a source of spray material, a swivel connection for the lower end of said conduit intermediate said nozzle-positioning stations and adjacent said frame providing for swinging movement of said conduit on a vertical axis to move said spray nozzle selectively to said nozzle-positioning stations, and releasable catch means at each station engageable with the upper portion of said conduit to hold the latter from displacement.

DAVID S. HENRY.

REFERENCES CITED

The following references are of record in the file of this patent:

UNITED STATES PATENTS

| Number | Name | Date |
| --- | --- | --- |
| 819,602 | Rupp | May 1, 1906 |
| 1,042,685 | Kelley | Oct. 29, 1912 |
| 1,085,973 | Conkling | Feb. 3, 1914 |
| 1,900,837 | Mills | Mar. 7, 1933 |
| 2,265,063 | Crumly | Dec. 2, 1941 |
| 2,507,668 | Hamilton et al. | May 16, 1950 |

FOREIGN PATENTS

| Number | Country | Date |
| --- | --- | --- |
| 638,676 | France | Feb. 27, 1928 |